US008341942B2

(12) United States Patent
Brück et al.

(10) Patent No.: US 8,341,942 B2
(45) Date of Patent: Jan. 1, 2013

(54) METHOD FOR PROVIDING AMMONIA FOR THE SELECTIVE CATALYTIC REDUCTION OF NITROGEN OXIDES AND CORRESPONDING DEVICE

(75) Inventors: Rolf Brück, Bergisch Gladbach (DE); Peter Hirth, Rösrath (DE)

(73) Assignee: EMITEC Gesellschaft fuer Emissionstechnologie mbH, Lohmar (DJ)

( * ) Notice: Subject to any disclaimer, the term of this patent is extended or adjusted under 35 U.S.C. 154(b) by 547 days.

(21) Appl. No.: 12/604,522

(22) Filed: Oct. 23, 2009

(65) Prior Publication Data
US 2010/0037598 A1    Feb. 18, 2010

Related U.S. Application Data

(63) Continuation of application No. PCT/EP2008/055435, filed on May 2, 2008.

(30) Foreign Application Priority Data

May 8, 2007   (DE) .......................... 10 2007 031 530

(51) Int. Cl.
*F01N 3/20*   (2006.01)
(52) U.S. Cl. ................ 60/286; 60/295; 60/301
(58) Field of Classification Search .............. 60/286, 60/295, 301, 303
See application file for complete search history.

(56) References Cited

U.S. PATENT DOCUMENTS

| 5,116,579 | A | 5/1992 | Kobayashi et al. |
| 6,032,461 | A | 3/2000 | Kinugasa et al. |
| 6,415,602 | B1 | 7/2002 | Patchett et al. |
| 7,028,465 | B2 | 4/2006 | Ripper et al. |
| 2003/0135323 | A1* | 7/2003 | Votsmeier et al. ............ 701/115 |
| 2004/0098972 | A1 | 5/2004 | Upadhyay et al. |
| 2005/0013756 | A1 | 1/2005 | Amou et al. |
| 2005/0066652 | A1 | 3/2005 | Ketcher et al. |

(Continued)

FOREIGN PATENT DOCUMENTS

DE    69005322 T3    1/1999

(Continued)

OTHER PUBLICATIONS

International Search Report dated Sep. 1, 2008.

*Primary Examiner* — Thomas Denion
*Assistant Examiner* — Jonathan Matthias
(74) *Attorney, Agent, or Firm* — Laurence A. Greenberg; Werner H. Stemer; Ralph E. Locher

(57) ABSTRACT

A method and a device for providing ammonia for the selective catalytic reduction of nitrogen oxides in the exhaust system of an internal combustion engine, include the following steps: a) recording at least one actuating variable for influencing the state of the internal combustion engine; b) calculating a possible nitrogen oxide emission of the internal combustion engine on the basis of an evaluation of the at least one measured variable; c) calculating an ammonia quantity which corresponds to the possible nitrogen oxide emission; and d) initiating the provision of the corresponding ammonia quantity by exhaust-gas-external evaporation in an evaporator and exhaust-gas-external hydrolysis of aqueous urea solution, wherein at least one of the following values: i) the heating power of the evaporator or ii) the quantity of aqueous urea solution supplied to the evaporator, is regulated on the basis of the ammonia quantity calculated in step c).

5 Claims, 2 Drawing Sheets

U.S. PATENT DOCUMENTS

| | | |
|---|---|---|
| 2006/0101811 A1 | 5/2006 | Linna et al. |
| 2007/0203616 A1 | 8/2007 | Borrmann et al. |
| 2009/0120079 A1 | 5/2009 | Buckberry et al. |

FOREIGN PATENT DOCUMENTS

| | | |
|---|---|---|
| DE | 19743302 C1 | 2/1999 |
| DE | 19843960 A1 | 3/2000 |
| DE | 10100420 A1 | 7/2002 |
| DE | 69625823 T2 | 9/2003 |
| DE | 10346714 A1 | 6/2004 |
| DE | 10346715 A1 | 6/2004 |
| DE | 20308348 U1 | 7/2004 |
| DE | 102004030782 A1 | 1/2006 |
| DE | 60113147 T2 | 6/2006 |
| EP | 1481719 A2 | 12/2004 |
| WO | 2006087541 A1 | 8/2006 |

* cited by examiner

M [1]

19  21  22  23    Ω [1]

US 8,341,942 B2

METHOD FOR PROVIDING AMMONIA FOR THE SELECTIVE CATALYTIC REDUCTION OF NITROGEN OXIDES AND CORRESPONDING DEVICE

CROSS-REFERENCE TO RELATED APPLICATION

This is a continuation, under 35 U.S.C. §120, of copending International Application No. PCT/EP2008/055435, filed May 2, 2008, which designated the United States; this application also claims the priority, under 35 U.S.C. §119, of German Patent Application DE 10 2007 031 530.0, filed May 8, 2007; the prior applications are herewith incorporated by reference in their entirety.

BACKGROUND OF THE INVENTION

Field of the Invention

The subject matter of the present invention includes a method for providing ammonia for the selective catalytic reduction of nitrogen oxides in the exhaust system of an internal combustion engine. The subject matter of the invention also includes a corresponding device for carrying out the method.

In many countries, numerous components in the exhaust gas of internal combustion engines are considered undesirable. In order to keep the emission of those constituents of the exhaust gas as low as possible, legally stipulated limit values often exist to which the exhaust gases of internal combustion engines must adhere. One possible undesirable constituent is nitrogen oxides ($NO_x$). The emission of nitrogen oxides can firstly be reduced by engine-internal measures. The reduction may secondly take place through the use of alternative or additional exhaust-gas aftertreatment. One option for the exhaust-gas aftertreatment of internal combustion engines is the selective catalytic reduction of the nitrogen oxides. In that method, the nitrogen oxides are reduced through the use of a reducing agent which acts selectively thereon, such as for example ammonia.

Due to the intense dynamics of the nitrogen oxide emission which is present, specifically in dynamic applications such as in automobiles due to the fast and in part significant changes in load states of the internal combustion engine, conventional controllers for metering reducing agent to the exhaust gas of internal combustion engines often have problems caused by those dynamics. Those problems result in an inadequate conversion of the nitrogen oxides in the exhaust gas of the internal combustion engine.

SUMMARY OF THE INVENTION

It is accordingly an object of the invention to provide a method and a corresponding device for providing ammonia for the selective catalytic reduction of nitrogen oxides, which overcome or at least alleviate the hereinafore-mentioned disadvantages of the heretofore-known methods and devices of this general type and which permit the most effective possible conversion of nitrogen oxides, in particular even under highly dynamic changes in the nitrogen oxide concentration in the exhaust gas of the internal combustion engine.

With the foregoing and other objects in view there is provided, in accordance with the invention, a method for providing ammonia for the selective catalytic reduction of nitrogen oxides in the exhaust system of an internal combustion engine. The method comprises:

a) recording at least one actuating variable for influencing a state of the internal combustion engine;
b) calculating a possible nitrogen oxide emission of the internal combustion engine on a basis of an evaluation of at least one measured variable;
c) calculating an ammonia quantity corresponding to a possible nitrogen oxide emission; and
d) initiating a provision of the corresponding ammonia quantity by evaporation outside the exhaust gas in an evaporator and hydrolysis of a urea-water solution outside the exhaust gas, with a regulation of at least one of the following variables:
  i. a heating power of the evaporator, or
  ii. a quantity of the urea-water solution supplied to the evaporator, on a basis of the ammonia quantity calculated in step c).

The recording of the actuating variable in step a) is to be understood in particular to mean a measurement of the actuating variables. In this case, it is alternatively or additionally possible to revert to stored data or for a corresponding calculation to take place. It is preferable to understand the present actual state of the internal combustion engine as a measured variable. The present actual state of the internal combustion engine is to be understood in particular as the present operating point in the characteristic map of the internal combustion engine. An actuating variable for influencing the state of the internal combustion engine is to be understood as any variable which can influence the operating state of the internal combustion engine. This is to be understood in particular to mean the pedal transducer of the throttle or gas pedal. The calculation of a possible nitrogen oxide emission of the internal combustion engine takes place in step b). In particular, the change in the actual state of the internal combustion engine resulting from the measured variables is taken into consideration in this case. This means, for example, that a possible nominal state of the internal combustion engine after an acceleration has taken place is inferred on the basis of the present operating state of the internal combustion engine and a change in the actuating angle of the pedal transducer, and the nitrogen oxide content in the exhaust gas which is present after the acceleration is calculated. On the basis of the nitrogen oxide emission, the ammonia quantity required for complete conversion is calculated, and the provision of the determined ammonia quantity is subsequently initiated. At least one previous value of at least one of the at least one measured variables is preferably taken into consideration in step b).

According to the invention, the evaporation and hydrolysis of the urea-water solution for the generation of ammonia takes place outside the exhaust gas, that is to say in components which are usually not traversed by exhaust gas. An electrically heated evaporator is preferably provided. Through the use of the evaporation and hydrolysis outside the exhaust gas, it is possible to precisely provide the required ammonia quantities. It is possible, in particular, for the hydrolysis catalytic converter to be constructed to be smaller than in embodiments in which it is in the exhaust line, since the corresponding gas quantity to be conducted through the hydrolysis catalytic converter is smaller.

The method according to the invention advantageously permits an adaptation of the ammonia dosing to highly dynamic changes in nitrogen oxide content in the exhaust gas, in such a way that the most effective possible conversion of the nitrogen oxides in the exhaust gas of the internal combustion engine is possible even, for example, in mobile applications such as motor vehicles, wherein at the same time it is not necessary to abandon the advantages of the generation of the ammonia from the urea-water solution outside the exhaust gas.

In accordance with another mode of the method of the invention, a stored quantity of reducing agent and the possible conversion thereof is taken into consideration in step c).

In particular, SCR (selective catalytic reduction) catalytic converters are used for carrying out the SCR reaction. The SCR catalytic converters have catalytically active coatings which have a certain storage capability for ammonia, in particular for ammonia. By taking into consideration the possible conversion, that is to say in particular the temperature of the exhaust gas and/or of the SCR catalytic converter, it is possible to extrapolate what quantity of ammonia is possibly released, and to correspondingly reduce the ammonia quantity to be provided.

In accordance with a further mode of the method of the invention, step b) includes an extrapolation to a future nitrogen oxide emission.

This means that, on the basis of the present actual state of the internal combustion engine in relation to at least one previous state of the internal combustion engine and/or at least one actuating variable for influencing the state of the internal combustion engine, it is calculated how the state of the internal combustion engine will change. Based on this, the nitrogen oxide emission to be expected is then calculated and a corresponding quantity of ammonia is provided. In this case, it is in particular also possible to revert to driver-specific values in such a way that, in one advantageous refinement, step b) includes a driver-adaptive determination of the future nitrogen oxide emission. In this case, the driving behavior of the driver, that is to say in particular his or her acceleration and/or deceleration behavior, is monitored discretely or continuously, and the resulting driver profile is used to predict the nitrogen oxide emission to be expected, in particular taking into consideration the values of the pedal transducer.

In accordance with an added mode of the method of the invention, a change in the state of the internal combustion engine is calculated on the basis of the change in the at least one actuating variable.

It is thus, for example, possible, on the basis of a change in the measured actuating angle of the pedal transducer of the throttle pedal, to estimate how an acceleration or braking process which is now starting will take place, and in what nominal state the internal combustion engine will be at the end of that acceleration or braking process.

Based on this, and in particular taking into consideration the path from the actual state to the nominal state in an engine characteristic map, it is possible to identify the times at which there will be a requirement for ammonia, and to trigger a corresponding provision of ammonia. In this case, it is preferably checked constantly as to whether the change in the state of the internal combustion engine follows the path which has been predicted or whether further corrections are necessary in this case. Further corrections may for example be required, even for a constant actuating variable, in the event of a change in the environment variables such as for example the inclination, a gradient which must be overcome or the like.

In accordance with an additional mode of the method of the invention, the probability of different possible changes in the state of the internal combustion engine from the actual state to possible nominal states is taken into consideration in step b).

In this case, it is taken into consideration that, for certain actual states and certain nominal states, there are different paths of greater or lesser probability. This is in particular because different rotational speed profiles over time are more probable than other rotational speed profiles. This is preferably taken into consideration in the calculation of a possible nitrogen oxide emission in particular through the use of a corresponding weighting, for example by virtue of weighting taking place with the probability of the possible occurrence of a certain rotational speed.

In accordance with yet another mode of the method of the invention, user-specific data is used in step b).

In the case of an internal combustion engine in mobile applications in particular, this includes the analysis of the behavior of the driver, in particular his or her acceleration and/or deceleration behavior, with that data advantageously being used as user-specific data for predicting and for calculating the nitrogen oxide emission to be expected. User-specific data is, in particular, data regarding the driving behavior of the user.

With the objects of the invention in view, there is concomitantly provided a device for providing ammonia for the selective catalytic reduction of nitrogen oxides in the exhaust system of an internal combustion engine, in particular for carrying out the method according to the invention. The device comprises a device for determining at least one of the following variables i) a present actual state of the internal combustion engine, or ii) at least one actuating variable for influencing the state of the internal combustion engine. A control device is provided for calculating a possible nitrogen oxide emission of the internal combustion engine on a basis of an evaluation of at least one measured variable taking into consideration at least one previous value of at least one of the at least one measured variables and for calculating an ammonia quantity corresponding to a possible nitrogen oxide emission. A device for providing an ammonia quantity includes an evaporator disposed outside the exhaust gas for evaporating a urea-water solution, a hydrolysis catalytic converter disposed outside the exhaust gas, and a device for supplying the urea-water solution to the evaporator.

The control device may, in particular, take the form of an electronic component, preferably as a part of the engine controller, or the form of correspondingly configured software, that is to say a computer program product.

Other features which are considered as characteristic for the invention are set forth in the appended claims.

Although the invention is illustrated and described herein as embodied in a method for providing ammonia for the selective catalytic reduction of nitrogen oxides and a corresponding device, it is nevertheless not intended to be limited to the details shown, since various modifications and structural changes may be made therein without departing from the spirit of the invention and within the scope and range of equivalents of the claims. The details and advantages disclosed for the method according to the invention can be applied and transferred to the device according to the invention and vice versa.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
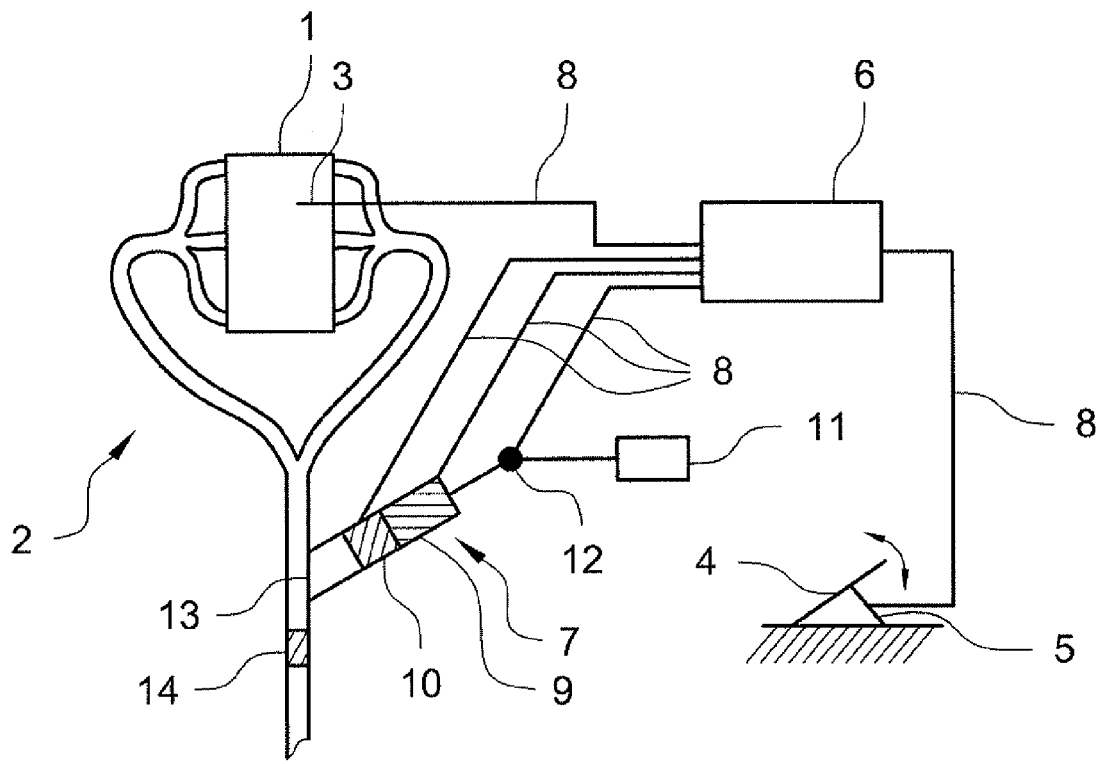
FIG. 1 is a fragmentary, diagrammatic and schematic view of an internal combustion engine having an exhaust system in which the method according to the invention is used.

Referring now in detail to the figures of the drawings, without being restricted to the exemplary embodiments shown therein, and first, particularly, to FIG. 1 thereof, there is seen an internal combustion engine 1 having an exhaust system 2. A device 3 for determining the actual state of the internal combustion engine 1 is provided. It is possible, in particular, for the rotational speed and/or the load state of the internal combustion engine 1 to be determined by the device 3. A throttle or gas pedal 4 which is fitted with a device 5 for determining the position of the throttle pedal 4, is also provided. The device 5 for determining the position of the throttle pedal 4 provides, in particular, an actuating variable for influencing the state of the internal combustion engine 1, since the operating state of the internal combustion engine 1, with regard in particular to rotational speed and/or load, varies according to the position of the throttle pedal 4. A control device 6 and a device 7 for providing ammonia are also provided. The control device 6 is connected over data lines 8 to different components, in particular to the device 3 for determining the actual state of the internal combustion engine 1, the device 5 for determining the position of the throttle pedal 4, which is a so-called pedal transducer, and to parts of the device 7 for providing ammonia.

The device 7 for providing ammonia is provided outside the exhaust gas, as shown in FIG. 1. That is to say, the device 7 is constructed so as to normally not be traversed by exhaust gas. In the present exemplary embodiment, this is achieved in such a way that a solution of reducing agent or of a reducing agent precursor, which can cleave to ammonia or react to form ammonia, is evaporated in an evaporator 9 which is followed by a hydrolysis catalytic converter 10 in which a hydrolysis of the evaporated reducing agent precursor solution can take place. In this case, the hydrolysis catalytic converter 10 includes a catalytically active layer or coating which is capable of catalyzing a reaction of urea to form ammonia. The evaporator 9 can be connected to a reservoir 11. A urea-water solution is stored in the reservoir 11. The urea-water solution can be fed into the evaporator 9 by a device 12 for supplying the urea-water solution, for example into the evaporator 9 by a pump. It is, for example, possible for the hydrolysis catalytic converter 10 and the evaporator 9 to be heated, with the control device 6 preferably also controlling the heating, in particular, of the evaporator 9 and if appropriate of the hydrolysis catalytic converter 10 as well. For this purpose, the components 9, 10 are preferably also connected over data lines 8 to the control device 6. The same applies to the device 12, which may likewise be connected to the control device 6 over a correspondingly constructed data line 8. During operation, a gas mixture including ammonia flows out of the hydrolysis catalytic converter 10. The gas mixture is introduced into the exhaust system 2 at an infeed point 13. An SCR catalytic converter 14 for the selective catalytic reduction of nitrogen oxides in the exhaust gas of the internal combustion engine 1 is provided downstream of the infeed point 13. The hydrolysis catalytic converter 10 and the SCR catalytic converter 14 may each include at least one honeycomb body which may preferably be constructed from metallic layers or include a ceramic monolith. In this case, a respectively correspondingly constructed catalytically active coating is applied to the honeycomb body, or catalytically active centers are correspondingly formed in the honeycomb body.

In the execution of the method according to the invention, the present actual state of the internal combustion engine 1 is firstly recorded by the correspondingly constructed device, in particular with the rotational speed and/or the torque of the internal combustion engine 1 being determined. The present position of the throttle pedal 4 is also determined through the use of the correspondingly constructed device 5. The data produced in this way is transmitted over the data lines 8, which may either include a wire or have a wireless construction, to the control device 6 and are processed further therein. A possible nitrogen oxide emission of the internal combustion engine 1 can now be calculated taking into consideration at least one previous value of the present actual state and/or the corresponding actuating variable such as the corresponding angle of the throttle pedal 4. This means in particular that the present actual state is compared with a previous actual state, and if appropriate a difference vector is determined which indicates a possible direction in the engine characteristic map. In this case, the change in the actuating variable, that is to say in particular in the position of the throttle pedal 4, may also be taken into consideration. It is thus possible to infer, from a corresponding change in the position of the throttle pedal 4, an acceleration or deceleration, which is now occurring, of a motor vehicle which is driven by the internal combustion engine 1. In this way, it is also possible to calculate future nitrogen oxide emissions and to correspondingly activate the device 7 for providing reducing agent, in such a way that when the exhaust gases with that nitrogen oxide content arrive at the SCR catalytic converter 14, precisely the correspondingly required quantity of ammonia is provided. This yields one of the advantages of the invention, specifically that more time is gained between the knowledge of the nitrogen oxide emission and the conversion, which can be utilized in particular in relatively inert systems for providing reducing agent in order to improve the conversion rate of the nitrogen oxides.

Figure 2:
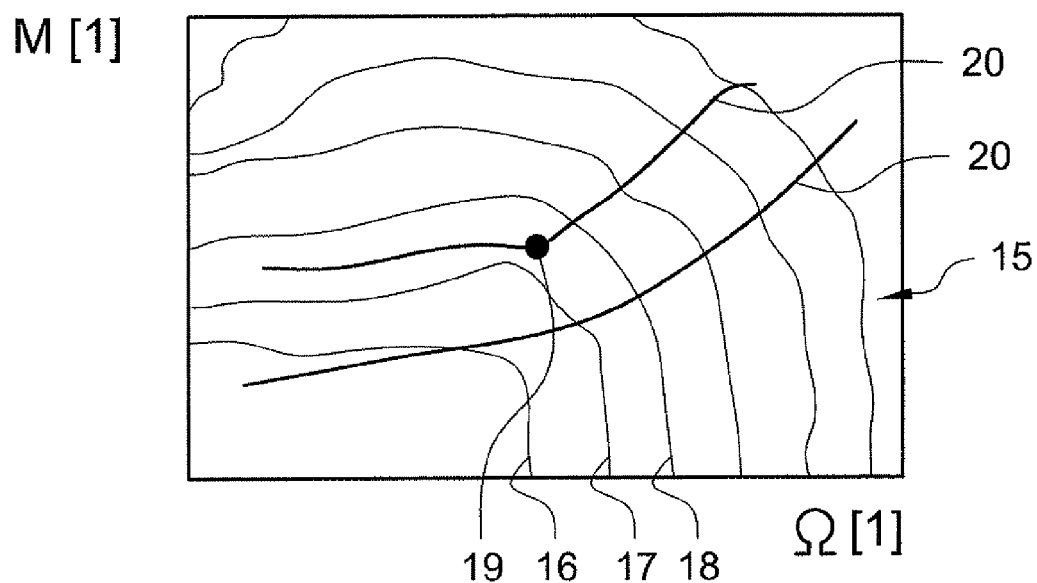
FIG. 2 is an illustration showing an example of an engine characteristic map.

FIG. 2 graphically shows a so-called engine characteristic map 15. In the present exemplary embodiment, the engine characteristic map 15 shows the emitted quantity of nitrogen oxide as a function of rotational speed $\Omega$ and torque M. Both the rotational speed $\Omega$ and the torque M are specified in arbitrary units. The corresponding nitrogen oxide emissions are plotted as a set of curves which connect values of equal nitrogen oxide emission to one another. For example, a first line 16 connects all the values of a nitrogen oxide emission of 100 ppm (parts per million), a second line 17 connects values with a nitrogen oxide emission of 200 ppm, a third line 18 connects values with a nitrogen oxide emission of 300 ppm, etc. A present actual state 19 is defined by the associated rotational speed $\Omega$ and the associated torque M. FIG. 2 also shows common acceleration profiles 20. The common acceleration profiles 20 indicate the reaction of the internal combustion engine 1 to an increase or reduction in rotational speed $\Omega$, which is usually reflected in a change in the applied torque M. The profile of the acceleration profiles 20 may vary as a function of external conditions such as in particular road surface, gradient, speed, air resistance, friction resistance and the like. A possible acceleration profile 20 can be extrapolated from the change in the position of the throttle pedal 4. In this case, it is possible in particular to revert to a parameter-adaptive adaptation method.

Figure 3:
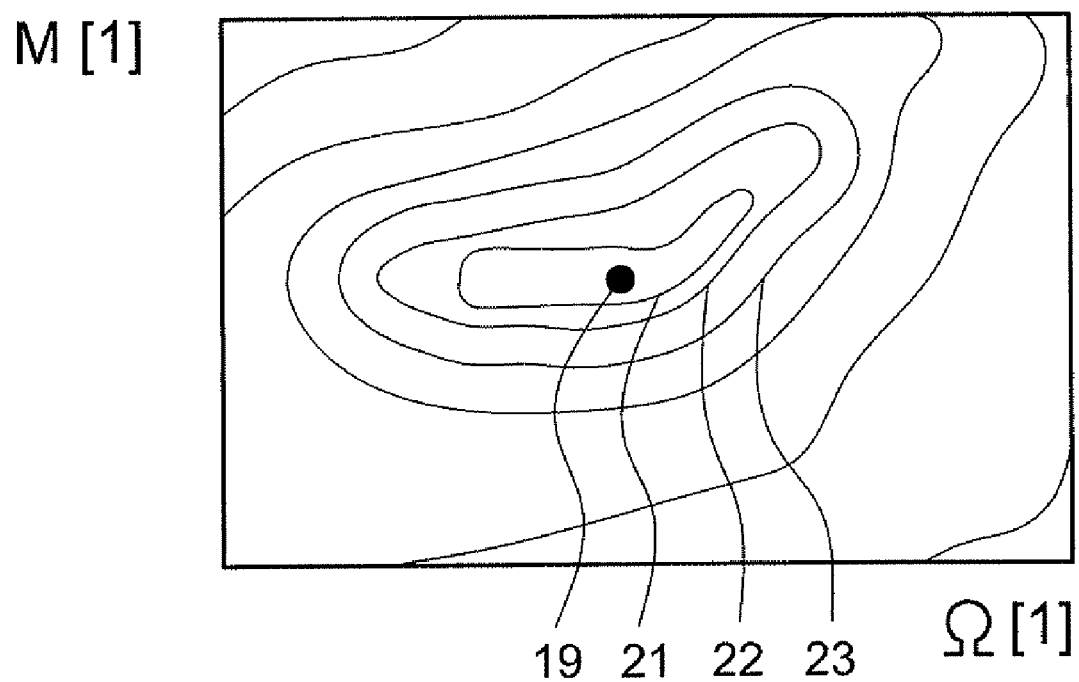
FIG. 3 is an illustration showing an example of a probability distribution of the engine characteristic map.

FIG. 3 shows an associated probability distribution. Proceeding from the actual state 19 of the internal combustion engine 1, FIG. 3 shows the probability with which certain nominal states of the internal combustion engine 1 can be attained. A first line 21 connects all those points which can be attained from the present actual state 19 with a probability of 90%. A second line 22 connects points with a probability of 85% to one another, and a line 23 connects points with a probability of 80% to one another. It is possible, on the basis of the probability data, together with the change in the at least one actuating variable such as, for example, the position of the throttle pedal 4, to very precisely calculate what nominal state can be attained as a result of the change in the actuating variable which has just taken place. However, the nitrogen oxide emission in the nominal state is known on the basis of the engine characteristic map 15, in such a way that the provision of a corresponding quantity of ammonia can then be initiated.

The method according to the invention and the device according to the invention extend the time margin for providing a corresponding quantity of ammonia as reducing agent for the selective catalytic reduction of the nitrogen oxides in the exhaust gas of an internal combustion engine 1, in such a way that a time advantage is obtained. The time advantage is based, for example, on the extrapolation of the nitrogen oxide emission proceeding from the actual state 19 of the internal combustion engine 1 and the change in at least one actuating variable such as, for example, the change in the position of the throttle pedal 4, taking into consideration the propagation time of the exhaust gas through the exhaust system 2 of the internal combustion engine 1. In this way, it is possible in particular for inert systems for providing reducing agent to be used effectively in such a way that an improved conversion of the nitrogen oxides in the exhaust gas of the internal combustion engine 1 can be obtained.

The invention claimed is:

1. A device for providing ammonia for the selective catalytic reduction of nitrogen oxides in the exhaust system of an internal combustion engine, the device comprising:
  a device for determining at least one of the following variables:
    i) a present actual state of the internal combustion engine, or
    ii) at least one actuating variable for influencing the state of the internal combustion engine;
  a control device configured for calculating a possible nitrogen oxide emission of the internal combustion engine on a basis of an evaluation of at least one measured variable taking into consideration at least one previous value of at least one of the at least one measured variables and for calculating an ammonia quantity corresponding to a possible nitrogen oxide emission;
  said control device configured to extrapolate to a future nitrogen oxide emission, calculate a change in the state of the internal combustion engine on a basis of a change in the at least one actuating variable and take a probability of different possible changes in the state of the internal combustion engine, from an actual state to possible nominal states, into consideration; and
  a device for providing an ammonia quantity, said device for providing an ammonia quantity including an evaporator disposed outside the exhaust gas for evaporating a urea-water solution, a hydrolysis catalytic converter disposed outside the exhaust gas, and a device for supplying the urea-water solution to said evaporator.

2. A method for providing ammonia for the selective catalytic reduction of nitrogen oxides in the exhaust system of an internal combustion engine, the method comprising the following steps:
  a) recording at least one actuating variable for influencing a state of the internal combustion engine;
  b) calculating a possible nitrogen oxide emission of the internal combustion engine on a basis of an evaluation of at least one measured variable;
  c) calculating an ammonia quantity corresponding to a possible nitrogen oxide emission;
  additionally providing a present actual state of the internal combustion engine as a measured variable;
  taking at least one previous value of at least one measured variable into consideration in step b);
  extrapolating to a future nitrogen oxide emission in step b);
  calculating a change in the state of the internal combustion engine on a basis of a change in the at least one actuating variable;
  taking a probability of different possible changes in the state of the internal combustion engine, from an actual state to possible nominal states, into consideration in step b); and
  d) initiating a provision of the corresponding ammonia quantity by evaporation outside the exhaust gas in an evaporator and hydrolysis of a urea-water solution outside the exhaust gas, with a regulation of at least one of the following variables:
    i) a heating power of the evaporator, or
    ii) a quantity of the urea-water solution supplied to the evaporator, on a basis of the ammonia quantity calculated in step c).

3. The method according to claim 2, which further comprises taking a stored quantity of reducing agent and a possible conversion thereof into consideration in step c).

4. The method according to claim 2, which further comprises using user-specific data in step b).

5. A device for carrying out the method according to claim 2, the device comprising:
  a device for determining at least one of the following variables:
    i) a present actual state of the internal combustion engine, or
    ii) at least one actuating variable for influencing the state of the internal combustion engine;
  a control device configured for calculating a possible nitrogen oxide emission of the internal combustion engine on a basis of an evaluation of at least one measured variable taking into consideration at least one previous value of at least one of the at least one measured variables and for calculating an ammonia quantity corresponding to a possible nitrogen oxide emission;
  said control device configured to extrapolate to a future nitrogen oxide emission, calculate a change in the state of the internal combustion engine on a basis of a change in the at least one actuating variable and take a probability of different possible changes in the state of the internal combustion engine, from an actual state to possible nominal states, into consideration; and
  a device for providing an ammonia quantity, said device for providing an ammonia quantity including an evaporator disposed outside the exhaust gas for evaporating a urea-water solution, a hydrolysis catalytic converter disposed outside the exhaust gas, and a device for supplying the urea-water solution to said evaporator.

* * * * *